United States Patent
Nishikawa et al.

(10) Patent No.: US 10,247,173 B2
(45) Date of Patent: *Apr. 2, 2019

(54) ELASTIC MOTOR-SPRING ACTUATOR

(71) Applicant: Arizona Board of Regents, acting for and on behalf of Northern Arizona University, Flagstaff, AZ (US)

(72) Inventors: Kiisa Nishikawa, Flagstaff, AZ (US); Theodore A. Uyeno, Flagstaff, AZ (US)

(73) Assignee: ARIZONA BOARD OF REGENTS, ACTING FOR AND ON BEHALF OF, NORTHERN ARIZONA UNIVERSITY, Flagstaff, AZ (US)

(*) Notice: Subject to any disclaimer, the term of this patent is extended or adjusted under 35 U.S.C. 154(b) by 542 days.

This patent is subject to a terminal disclaimer.

(21) Appl. No.: 14/944,857

(22) Filed: Nov. 18, 2015

(65) Prior Publication Data

US 2016/0084235 A1 Mar. 24, 2016

Related U.S. Application Data

(63) Continuation of application No. 13/203,185, filed as application No. PCT/US2010/000706 on Mar. 8, 2010, now Pat. No. 9,222,559.

(Continued)

(51) Int. Cl.
| | | |
|---|---|---|
| *H02K 7/00* | (2006.01) |
| *F03G 1/02* | (2006.01) |
| *F03G 1/00* | (2006.01) |
| *F16H 25/20* | (2006.01) |
| *F16H 33/02* | (2006.01) |
| *H02K 41/03* | (2006.01) |

(Continued)

(52) U.S. Cl.
CPC ............... *F03G 1/00* (2013.01); *F03G 1/02* (2013.01); *F03G 1/08* (2013.01); *F16H 25/20* (2013.01);
(Continued)

(58) Field of Classification Search
CPC ....... H02K 7/06–7/075; F16H 25/2012; F16H 25/2028; F16H 25/16; F03G 1/00; F03G 1/02

(Continued)

(56) References Cited

U.S. PATENT DOCUMENTS

| | | | |
|---|---|---|---|
| 4,449,416 A | 5/1984 | Huitema | |
| 4,509,002 A * | 4/1985 | Hollis, Jr. ............... B23Q 1/36 | 318/135 |

(Continued)

FOREIGN PATENT DOCUMENTS

| | | | |
|---|---|---|---|
| FR | 2861154 | 4/2005 | |
| FR | 2861154 A1 * | 4/2005 | ............ F16H 61/32 |
| JP | 55107080 | 8/1980 | |

OTHER PUBLICATIONS

Machine Translation, LEBAS, FR 2861154 A1, Apr. 2005.*

(Continued)

*Primary Examiner* — Thomas Truong
(74) *Attorney, Agent, or Firm* — Fennemore Craig, P.C.

(57) ABSTRACT

An actuator according to one embodiment of the present invention may include a fixed member and a free member. The free member is operatively engaged with the fixed member so that the free member is moveable with respect to the fixed member. The actuator also includes means for moving the free member with respect to the fixed member. An elastic element operatively associated with the free member and the fixed member is operable to store energy without a change in an overall length of the actuator.

8 Claims, 9 Drawing Sheets

Related U.S. Application Data

(60) Provisional application No. 61/158,563, filed on Mar. 9, 2009.

(51) Int. Cl.
*F03G 1/08* (2006.01)
*F16H 25/22* (2006.01)
*H02K 21/04* (2006.01)

(52) U.S. Cl.
CPC ............... *F16H 33/02* (2013.01); *H02K 7/00* (2013.01); *H02K 41/031* (2013.01); *F16H 25/2204* (2013.01); *F16H 2025/2059* (2013.01); *H02K 21/046* (2013.01); *H02K 2201/18* (2013.01); *H02K 2207/03* (2013.01); *Y10T 74/18568* (2015.01); *Y10T 74/18576* (2015.01)

(58) Field of Classification Search
USPC ...................................... 310/80; 74/89–89.22
See application file for complete search history.

(56) References Cited

U.S. PATENT DOCUMENTS

| | | | |
|---|---|---|---|
| 5,249,474 A * | 10/1993 | Gregory | B60K 17/28 74/15.66 |
| 5,720,202 A | 2/1998 | Senjo et al. | |
| 6,003,403 A | 12/1999 | Klippert et al. | |
| 6,234,034 B1 | 5/2001 | Ando | |
| 9,222,559 B2 * | 12/2015 | Nishikawa | F16H 25/20 |
| 2002/0047367 A1 | 4/2002 | Kim et al. | |
| 2005/0269893 A1 | 12/2005 | Fujimoto | |
| 2006/0169081 A1 | 8/2006 | Betson | |
| 2008/0051942 A1 | 2/2008 | Smith et al. | |
| 2008/0271552 A1 | 11/2008 | May | |
| 2009/0229846 A1 | 9/2009 | Kawano et al. | |
| 2009/0320463 A1 | 12/2009 | Jansen | |

OTHER PUBLICATIONS

Hurst, Jonathan W., et al., "An Actuator with Physically Variable Stiffness for Highly Dynamic Legged Locomotion," Proceeding of the 2004 IEEE International Conference on Robotics & Automation, New Orleans, LA, Apr. 2004, pp. 4662-4667.

Park, Hae-Won, et al., "Identification of a Bipedal Robot with a Complaint Drivetrain (Parameter Estimation for Control Design)," IEEE Control Systems Magazine, Apr. 2011, pp. 63-88, [Digital Object Identifier 10.1109/MCS.2010.939963, date of publication, Mar. 16, 2011].

PCT International Search Report and Written Opinion, dated May 18, 2010, PCT/US2010/00706, 7 pages.

European Search Report (Supplemental), dated Jun. 26, 2012, EPO Application No. 10751117.2, 15 pages.

* cited by examiner

ELASTIC MOTOR-SPRING ACTUATOR

CROSS-REFERENCE TO RELATED APPLICATIONS

This application is a continuation of U.S. patent application Ser. No. 13/203,185, filed on Dec. 2, 2011, now U.S. Pat. No. 9,222,559, which is the U.S. national stage of International Application No. PCT/US2010/000706, filed on Mar. 8, 2010, which claims the benefit of U.S. Provisional Patent Application No. 61/158,563, filed on Mar. 9, 2009, all of which are hereby incorporated herein by reference for all that they disclose.

CONTRACTUAL ORIGIN OF THE INVENTION

Financial assistance for this project was provided by the United States Government, NSF Numbers IBN-9809942, IBN-0215438, IBN-0240349, IOS-0623791, IOS-0732949; and the United States Government may own certain rights to this invention.

TECHNICAL FIELD This invention relates to actuator systems in general and more particularly to actuators that simulate biological muscle contraction.

BACKGROUND ART

Generally speaking, an actuator is a mechanical device or system that is used to control another mechanical device or system. Most actuators take energy, typically in the form of a pressurized fluid (e.g., for pneumatic and hydraulic actuators) or electricity (e.g., for electric motors and solenoids) and convert it into mechanical motion that can be used to control or move the mechanical device or system.

While it is possible to design such actuators to have any of a wide range of operating characteristics and responses, it has proven considerably more difficult to design actuators that can faithfully reproduce or simulate the behavior of biological muscle contractions. For example, muscular motion in both humans and animals is dependent upon the storage of energy and the interaction of certain proteins upon stimulation by chemical entities such as calcium. The classical model of muscular movement is known as the "sliding filament theory." However, this theory does not explain extremely rapid muscular movement such as a toad using the tongue to capture an insect, which is a near instantaneous muscle movement. Actuators that can more closely simulate or replicate biological muscle contractions could be used to advantage in a wide range of fields and applications, including the fields of robotics and prosthetics.

DISCLOSURE OF INVENTION

An actuator according to one embodiment of the present invention may include a fixed member and a free member. The free member is operatively engaged with the fixed member so that the free member is moveable with respect to the fixed member. The actuator also includes means for moving the free member with respect to the fixed member. An elastic element operatively associated with the free member and the fixed member is operable to store energy without a change in an overall length of the actuator.

Another embodiment of an actuator according to the present invention may include a fixed member and a connector member. The connector member is operatively engaged with the fixed member so that the connector member can move with respect to the fixed member. A free member is operatively engaged with the connector member so that the free member can move with respect to the fixed member. A drive system operatively associated with the fixed member and the connector member is operable to move the connector member with respect to the fixed member. A first end of an elastic element is connected to the free member, whereas a second end of the elastic element is connected to said connector member.

Another embodiment of an actuator according to the present invention may include a housing and a plurality of electromagnets positioned around the housing so that the electromagnets define at least one generally helical path. A rotor head mounted for rotation and translation within the housing includes at least one magnet mounted thereon and an output shaft mounted thereto. A spring attached to the rotor head is selectively engageable and disengagable with the housing. A control system operatively associated with the plurality of electromagnets selectively activates the electromagnets.

BRIEF DESCRIPTION OF THE DRAWINGS

Illustrative and presently preferred embodiments of the invention are shown in the accompanying drawing in which.

Illustrative and presently preferred embodiment of the invention are shown in the accompanying drawings in which.

BEST MODE FOR CARRYING OUT THE INVENTION

Figure 1:
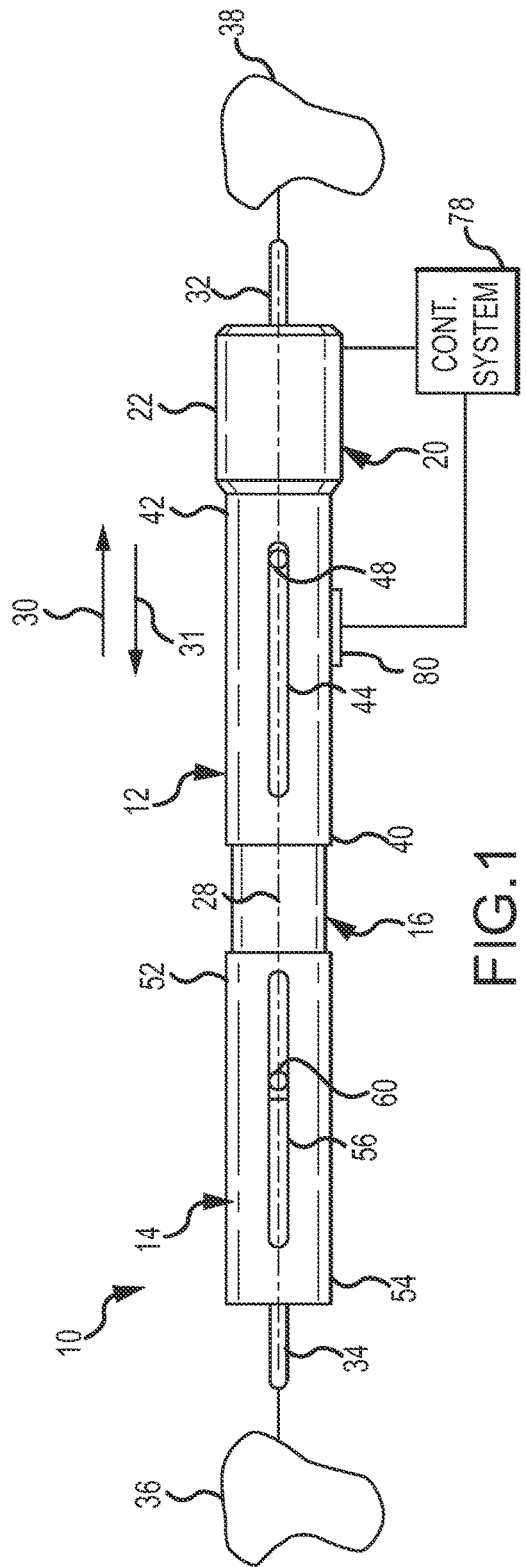
FIG. 1 is a plan view of a first embodiment of an actuator according to the present invention.

A first embodiment 10 of an elastic motor-spring actuator according to the present invention is illustrated in FIGS. 1-4 and may comprise a fixed member 12 and a free member 14.

The fixed and free members 12 and 14 are operatively connected together so that the free member 14 is moveable with respect to the fixed member 12. In the embodiment 10 shown in FIGS. 1-4, the fixed and free members 12 and 14 are operatively connected together by a connector member 16. Alternatively, the fixed and free members 12 and 14 can be operatively connected together without a connector member 16, such as, for example, as in the case of a second embodiment 210, illustrated in FIGS. 6-11.

Figure 2:
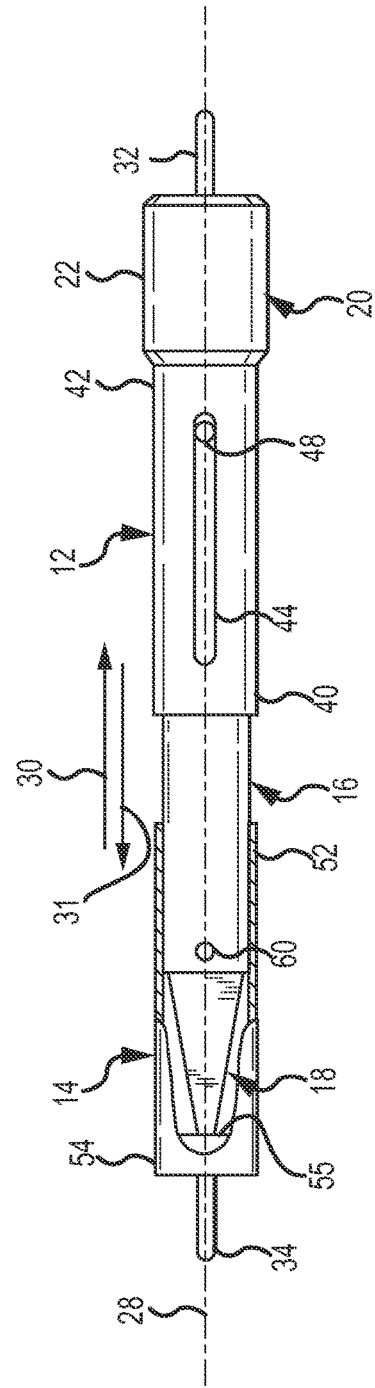
FIG. 2 is a plan view of the actuator illustrated in FIG. 1 with a portion of the free member broken away to show the elastic element.

The actuator 10 may also comprise an elastic element 18 that is operatively associated with the fixed and free members 12 and 14, as best seen in FIG. 2. In the first embodiment 10, the elastic element 18 is connected to the fixed member 14 via the connector member 16. Alternatively, other arrangements, such as the arrangement of the second embodiment 210, are also possible for operatively connecting the fixed and free members 12 and 14 with an elastic element 18.

Figure 3:
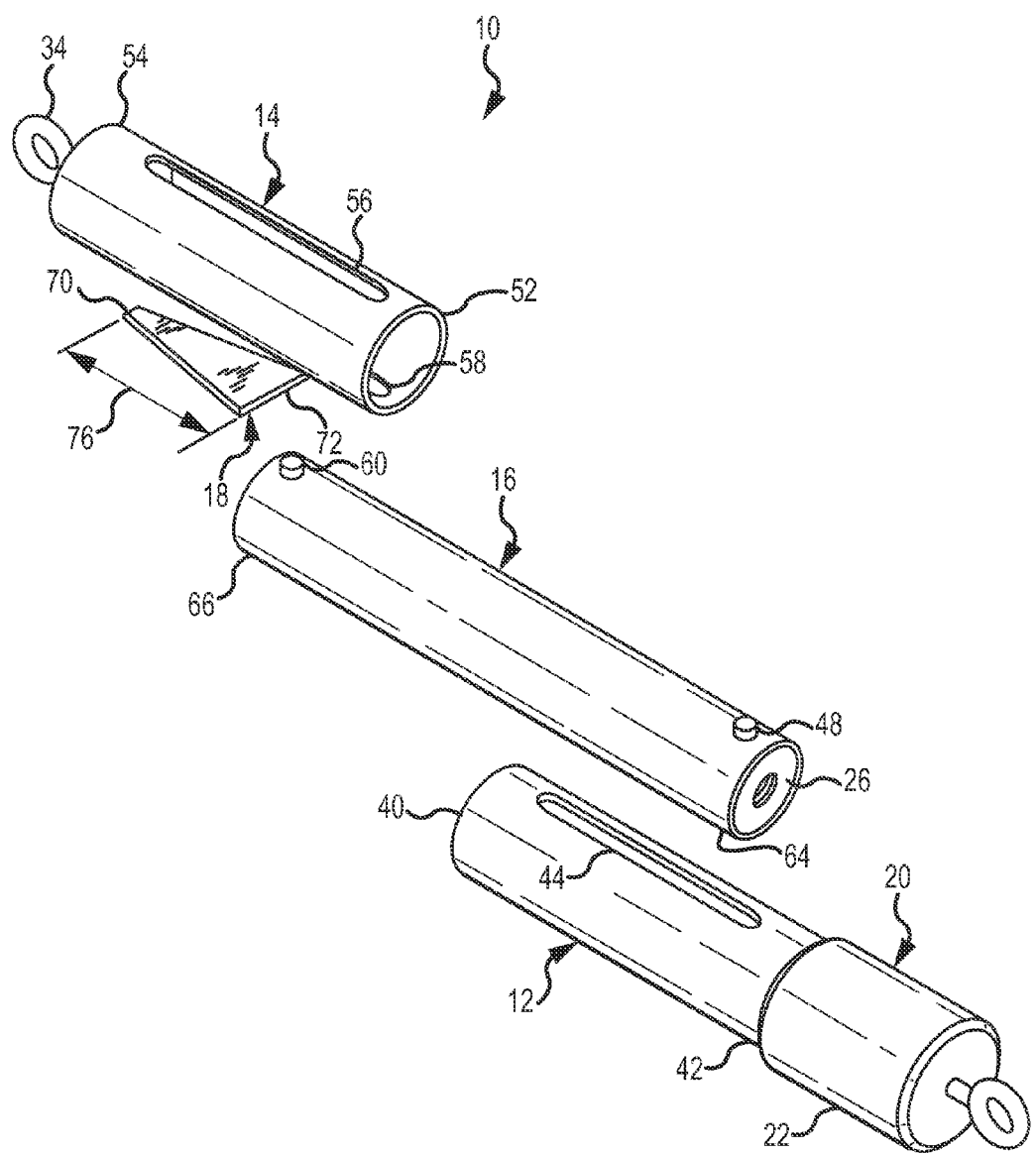
FIG. 3 is an exploded perspective view of the first embodiment of the actuator showing the various components thereof.

As will be described in much greater detail herein, elastic element 18 provides actuator 10 with a degree of compliance or springiness. In certain embodiments, the degree of compliance can be changed or tuned as may be desired for the particular application. In addition, the compliance of actuator 10 may be changed or varied depending on the degree of force that is provided on (or exerted by) actuator 10. In one embodiment, elastic element 18 may comprise a trapezoidal configuration, as best seen in FIGS. 2 and 3. The trapezoidal configuration causes the elastic element 18 to elongate non-linearly in response to a given force, thereby providing the actuator 10 with a non-linear compliance. Alternatively, other configurations for elastic element 18 are possible and may be used to provide actuator 10 with any of a wide range of compliance characteristics.

Actuator 10 may also comprise a drive system 20 that is operatively associated with the fixed and free members 12 and 14. Drive system 20 provides a means for moving the free member 14 with respect to the fixed member 12 and may comprise a variety of components and elements suitable for providing this function. By way of example, in the embodiment 10 illustrated in FIGS. 1-4, drive system 20 may comprise a motor 22 mounted to fixed member 12. Motor 22 is operatively connected to a lead screw 24. A nut 26 mounted to connector member 16 engages lead screw 24. Rotation of lead screw 24 by motor 22 causes nut 26, thus connector member 16, to move or translate along a longitudinal axis 28 of actuator 10, i.e., generally in the directions indicated by arrows 30 and 31. See FIGS. 1 and 2.

The fixed and free members 12 and 14 of actuator 10 also may be configured to attach to the particular load that is to be acted on by actuator 10. For example, in the embodiment illustrated in FIGS. 1-4, actuator 10 may be provided with respective mounting lugs or rings 32 and 34 to allow the actuator 10 to be operatively connected to a load, i.e., moveable device or object 36, that is to be acted on by actuator 10. For example, in one example configuration, first ring 32 may be attached or connected to a fixed object 38, whereas second ring 34 may be attached or connected to the moveable object 36.

Actuator 10 may be operated as follows to act on a load, such as an object 36 attached to ring 34. Generally speaking, actuator 10 will be used to provide a pulling or contraction force (i.e., a force in the direction of arrow 30) to the moveable object 36, although the actuator 10 may also be used to provide an extension force (i.e., in the direction of arrow 31). Depending on the relative initial position of the moveable object 36, as well as on the initial length of actuator 10, elastic element 18 may be slightly stretched or elongated at an initial condition. That is, the actuator 10 may be pre-loaded, applying a slight contractile force to the moveable object 36.

Additional contractile force can be applied to the object 36 by operating the drive system 20. More specifically, motor 22 will rotate the lead screw 24 in a direction that will cause the nut 26 (FIGS. 3 and 4) to move in direction 30. The movement of nut 26 will cause the connector member 16 and free member 14 to move in direction 30 as well. As the connector member 16 moves in direction 30, it pulls on free member 14 via elastic element 18. Elastic element 18 extends or stretches until the force exerted on elastic element 18 equals the resistance offered by the object 36. Thereafter, moveable object 36 will move in direction 30.

In addition to the application of a contraction force, i.e., a force in the direction of arrow 30, actuator 10 may be operated to apply to object 36 an extension force, i.e., a force in the direction of arrow 31. Application of the extension force may be accomplished by reversing the direction of motor 22. To the extent that elastic element 18 is stretched or elongated during the contraction cycle, movement of the actuator 10 in the extension direction 31 will be assisted by the energy stored in elastic element 18. If the elastic element 18 becomes fully relaxed, continued rotation of lead screw 24 will cause the connector module 16 to continue to move in direction of arrow 31, until pins 60 and 62 contact the ends of respective slots 56 and 58. At this point, continued movement of connector module 16 will result in corresponding movement of free member 14 in the direction of arrow 31.

A significant advantage of the present invention is that it may be operated in a manner that closely simulates biological muscle contraction. Consequently, actuators according to the present invention may be used to advantage in a wide range of fields and applications, including the fields of robotics and prosthetics. More particularly, actuators of the present invention may be operated in accordance with a "winding filament" or "winding spring" model for how the protein titin contributes to biological muscle contraction. Stated another way, an actuator made in accordance with the teachings of the present invention does not function simply as a linear motor, but includes an elastic energy storage element as well. The elastic element is capable of changing its compliance automatically in order to maximize the work done by the actuator. That is, not only can the drive system do work on the elastic element, but the elastic element may do work on the drive system, speeding the return or recoil of the actuator.

Moreover, and like the titin model, the actuator of the present invention is capable of storing elastic energy without a change in overall length of the actuator. In addition, the change in length and compliance of the actuator is tunable and further these characteristics (i.e., length and compliance) may differ depending on whether the actuator is shortening or contracting while energized or passively recoiling due to the return of elastic energy from the elastic element. The elastic element exhibits recoil during fast unloading and exhibits a tuneable non-linear relationship between the magnitude of the load and the compliance of the actuator. The overall characteristics of the actuator are such that the actuator becomes less compliant with stronger contraction forces and more compliant with weaker contraction forces.

Having briefly described one embodiment of the actuator according to the present invention, as well as some of its more significant features and advantages, various exemplary embodiments of actuators according to the present invention will now be described in detail. However, before proceeding with the detailed description, it should be noted that, while the various embodiments are shown and described herein as they might be used in certain operational scenarios to act on and move object 36 with respect to another object 38, actuators according to the present invention may be used in a wide range of applications and in a wide range of operational scenarios, as would become apparent to persons having ordinary skill in the art after having become familiar with the teachings provided herein. Consequently, the present invention should not be regarded as limited to the particular embodiments, devices, and operational scenarios shown and described herein.

Referring back now to FIG. 1, a first embodiment 10 of actuator according to the present invention may comprise a fixed or contractile module 12 and a free or compliant module 14. A connector member or module 16 operatively connects the contractile and compliant modules 12 and 14 together so that the compliant module 14 can move with respect to the contractile module 12.

Before proceeding with the description, it should be noted that, as used herein, the terms "fixed" and "free" are used for convenience in referring to those components of the actuator that, in the embodiments described herein, are generally "fixed" and "free" during normal actuator operation. That is, in a typical application, the fixed member 12 of actuator 10 is attached to an object or device that will remain stationary during actuator operation, whereas the free member 14 will be attached to an object or device that is to be moved (or acted on) by actuator 10. However, in an alternative arrangement, the free member 14 of actuator 10 could be connected to a "fixed" (i.e., immovable) object, in which case it could be referred to in such an alternative arrangement as the "fixed" member. In still another arrangement, both ends of actuator 10 could be connected to moveable objects, i.e., both ends of actuator 10 may move relative to some arbitrary fixed reference frame.

However, because persons having ordinary skill in the art would appreciate this difference and would readily understand that the fixed and free members 12 and 14 of actuator 10 may not necessarily be "fixed" and "free" in any particular application, the following description will continue to use the terms "fixed" and "free" as a matter of convenience without being limited to whether the fixed and free members 12 and 14 are truly "fixed" and "free" in a particular actuator application.

Continuing now with the description, in the embodiment shown and described herein, the fixed member 12 may comprise a generally elongate, tubular structure having a proximal end 40 and a distal end 42 that is sized to slidably receive the connector member or module 16, as best seen in FIGS. 1 and 2. Because the fixed member 12 generates the forces for contraction and elongation, i.e., forces in the directions of arrows 30 and 31, respectively, via rotation of lead screw 24, it may be referred to herein in the alternative as "contractile module" 12.

Figure 4:
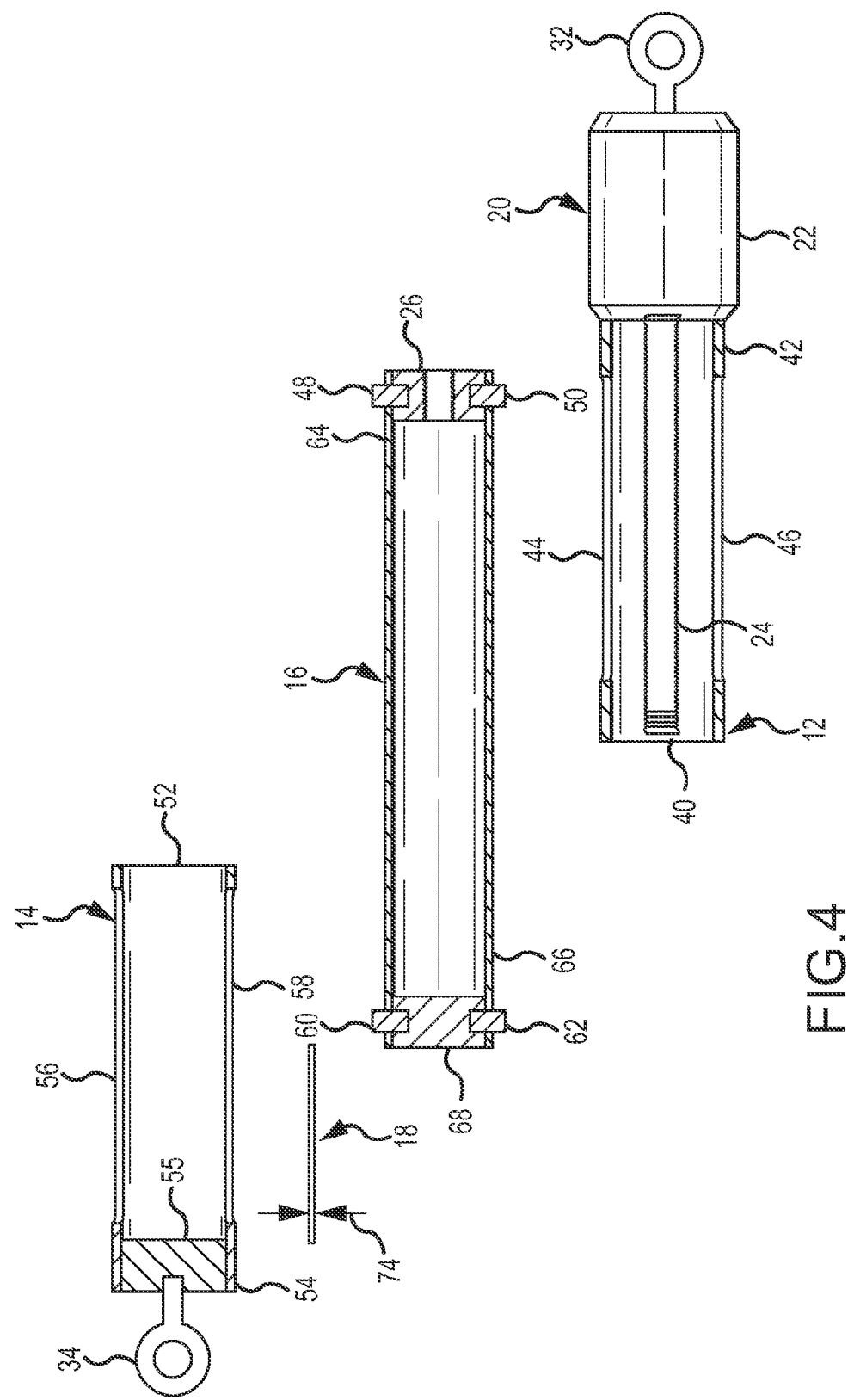
FIG. 4 is an exploded sectional view in elevation of the actuator components illustrated in FIG. 3.

Contractile module 12 may be provided with a pair of elongated slots 44 and 46, as best seen in FIG. 4. Elongated slots 44 and 46 are sized to slidably receive respective pins 48 and 50 provided on a first end 64 of connector member 16. See FIGS. 1, 2, and 4. The engagement of the pins 48 and 50 with respective slots 44 and 46 allows the connector member 16 to slide back and forth along axis 28, i.e., generally in the directions of arrows 30 and 31, as best seen in FIGS. 1 and 2. The engagement of pins 48 and 50 with slots 44 and 46 limits the axial movement or travel of the connector module 16 and also prevents the connector member 16 from rotating with respect to contractile module 12. Distal end 42 of contractile module 12 may be configured to receive the motor 22 and lead screw 24 of drive system 20 in the manner that will be described in greater detail below.

Contractile module 12 may be fabricated from any of a wide range of materials (e.g., metals or plastics) that are now known in the art or that may be developed in the future that are, or would be, suitable for use in the intended application. Consequently, the present invention should not be regarded as limited to a contractile module fabricated from any particular material. However, by way of example, in one embodiment, contractile module 12 is fabricated from acrylic plastic. In another embodiment, the contractile module 12 is fabricated from brass.

Free member 14 is similar in certain respects to the fixed member 12 and may also comprise a generally elongate, tubular structure having a proximal end 52 and a distal end 54, as best seen in FIGS. 1-4. As was the case for fixed member 12, free member 14 is also sized or configured to slidably receive connector member or module 16. Because free member 14 provides the compliance, recoil, and elasticity functions of actuator 10, free member 14 also may be referred to herein in the alternative as "compliant module" 14.

Compliant module 14 also may be provided with a pair of elongated slots 56 and 58 therein that are sized to receive respective pins 60 and 62 provided on a second end 66 of connector member 16. The engagement of the pins 60 and 62 with respective slots 56 and 58 allows compliant module 14 to slide back and forth along axis 28, generally in the directions of arrows 30 and 31. The engagement of pins 60, 62 and slots 56, 58 limits the travel or movement of connector module 16 with respect to compliant module 14 and also prevents the compliant module 14 from rotating with respect to connector member 16. In one embodiment, distal end 54 of compliant module 14 may be sized to receive an end cap 55. End cap 55 may be configured to receive ring 34 suitable for engaging the load or object 36. Alternatively, other structures and arrangements may be used to operatively connect the compliant module 14 to the load or object 36, as would become apparent to persons having ordinary skill in the art after having become familiar with the teachings provided herein. Consequently, the present invention should not be regarded as limited to any particular arrangement or structure for connecting the actuator 10 to the load.

Compliant module 14 also may be fabricated from any of a wide range of materials (e.g., metals or plastics) now known in the art or that may be developed in the future that are, or would be, suitable for use in the intended application. Consequently, the present invention should not be regarded as limited to any particular material. However, by way of example, in one embodiment, compliant module 14 is fabricated from brass, although other materials, such as acrylic plastic, may be used as well.

Connector member or module 16 may comprise a generally elongate, tubular structure that is sized to be slidably received by the contractile and compliant modules 12 and 14 in the manner described above. In the particular exemplary embodiment shown and described herein, connector member or module 16 is sized to be received by the contractile and compliant modules 12 and 14 in the manner illustrated in FIGS. 1 and 2. That is, connector module 16 is sized to fit inside the contractile and compliant modules 12 and 14. Alternatively, other arrangements are possible. For example, in another embodiment, connector member 16 may be sized to receive the contractile and compliant modules. That is, connector member 16 may fit or slide over the contractile and compliant modules 12 and 14. In still another alternative arrangement, the various modules 12, 14, and 16 could comprise a "telescoping" type of arrangement, wherein the connector module 16 fits inside the contractile module 12, and wherein the compliant module 14 fits inside connector module 14, or vice-versa.

Referring now primarily to FIGS. 3 and 4, a first end 64 of connector member 16 is sized to receive nut 26. As described herein, nut 26 operatively engages the lead screw 24 provided within contractile module 12. The first end 64 of connector member 16 may also be provided with a pair of pins 48 and 50 that are configured to slidably engage the slots 44 and 46 provided in contractile module 12 in the manner already described. Alternatively, pins 48 and 50 could be provided on nut 26, as would become apparent to persons having ordinary skill in the art after having become familiar with the teachings provided herein. Accordingly, the present invention should not be regarded as limited to the particular arrangement of nut 26 and pins 48 and 50 shown and described herein.

Second end 66 of connector member 16 may be provided with an end cap 68, as best seen in FIG. 4. End cap 68 may be provided with a pair of pins 60, 62 that are configured to slidably engage the slots 56 and 58 provided on compliant module 14, in the manner already described. Alternatively, pins 60 and 62 could be otherwise provided on second end 66 of connector member 16. In addition, end cap 68 may also be provided with a suitable attachment structure or mounting lug (not shown) to allow elastic element 18 to be secured to connector member 16. See FIG. 2. Alternatively, elastic element 18 could be secured to end cap 68 by means of an adhesive.

As was the case for the contractile and compliant modules 12 and 14, connector member 16 may be fabricated from any of a wide range of materials, such as metals or plastics, that are now known in the art or that may be developed in the future that are, or would be, suitable for use in the intended application. Consequently, the present invention should not be regarded as limited to any particular material. However, by way of example, in one embodiment, connector member 16 is fabricated from aluminum. End cap 68 may likewise be fabricated from any of a wide range of materials suitable for the intended application. By way of example, in one embodiment, end cap 68 is fabricated from acrylic plastic. Alternatively, other materials could be used, as would become apparent to persons having ordinary skill in the art after having become familiar with the teachings provided herein.

Actuator 10 may also comprise an elastic element 18. As briefly described above, elastic element 18 provides the actuator 10 with compliance or springiness and also serves as an energy storage element. That is, and as will be described in greater detail below, the drive system 20 can do work on (i.e., store energy in) elastic element 18 while the actuator 10 is contracting (e.g., during a contraction cycle). In addition, the elastic element 18 can also do work on (i.e., return energy to) the drive system 20 while the actuator 10 is extending (e.g., during an extension cycle). Elastic element 18 may be configured to provide the actuator 10 with any of a wide range of compliance properties or "schedules," depending on the particular materials, shapes, and configurations of elastic element 18.

For example, and with reference now primarily to FIGS. 2 and 3, in one embodiment, elastic element 18 may comprise an elastic material having non-linear elongation properties. More particularly, elastic member 18 may comprise a thin, sheet-like member having a trapezoidal configuration wherein a first end 70 has a smaller dimension or is shorter than a second end 72. The trapezoidal configuration of elastic element 18 causes the elastic element 18 to elongate or stretch in a non-linear manner with a given force. The non-linear response of the elastic element 18 causes the compliance of the actuator 10 to vary depending on the contractile force that is applied by the actuator 10. In the particular embodiment shown and described herein, the actuator 10 will become less compliant with increased contraction forces and more compliant with decreased contraction forces.

The specific dimensions of the elastic element 18, as well as the particular material from which it may be fabricated, may be varied depending on a wide range of factors, including the particular degree of compliance and compliance variation (i.e., non-linear response) that may be required or desired in the particular application. Consequently, the present invention should not be regarded as limited to elastic elements fabricated from any particular material or having any particular dimensions. However, by way of example, in one embodiment, the elastic element 18 may comprise latex having a thickness 74 (FIG. 4) of about 0.2 mm (about 0.008 inches) and an overall length 76 of about 25 mm (about 1 inch). The length of short end 70 is about 5 mm (about 0.2 inches), whereas the length of long end 72 is about 10 mm (about 0.4 inches).

As described herein, the elastic element 18 may comprise any of a wide range of materials having any of a wide range of configurations or shapes to provide the actuator 10 with any of a wide range of compliance characteristics. An elastic element 18 comprising the trapezoidal configuration illustrated in FIGS. 2-4 is one example of an elastic element 18 that may be used. However, other arrangements and configurations are possible. For example, another embodiment may comprise an adjustable elastic element 118. Adjustable elastic element 118 may be used or implemented to provide the actuator 10 with adjustable compliance characteristics. In addition, the adjustable elastic element 118 will allow the compliance of the actuator 10 to be adjusted "on-the-fly," i.e., during actuator operation, as will be described in greater detail below.

Figure 5:
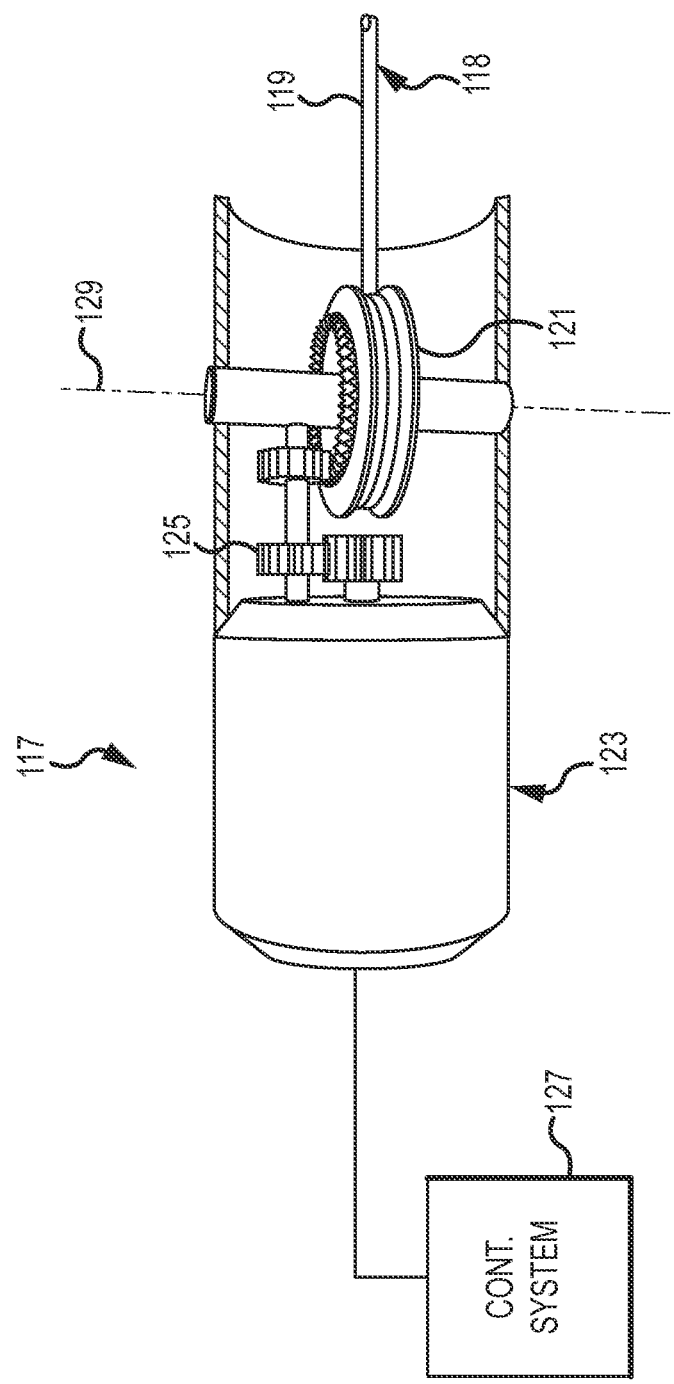
FIG. 5 is a perspective view of an adjustable elastic element that may be substituted for the elastic element illustrated in FIGS. 1-4.

Referring now primarily to FIG. 5, in another embodiment, adjustable elastic element 118 may comprise a take-up system 117 that may be used to lengthen and shorten an operating length 119 of the elastic element 118. Changing the operating length 119 of elastic element 118 will change the compliance of actuator 10. Depending on the application, the take-up system 117 may be operated before the actuator 10 is operated to provide actuator 10 with a desired degree of compliance. Alternatively, the take-up system 117 may be operated on-the-fly, i.e., during actuator operation, to dynamically change the compliance of actuator 10 during operation.

In the particular embodiment illustrated in FIG. 5, take-up system 117 may be mounted to the distal end 54 (FIGS. 1 and 2) of compliant module 14. Take-up system 117 may comprise a spool 121 operatively connected to a drive motor 123, such as, for example, via a transmission assembly 125. A control system 127 operatively connected to drive motor 123 may be used to operate drive motor 123. Drive motor 123 may be used to rotate spool 121 about axis 129 to change the operating length 119 (i.e., the operating length 119 refers to the relaxed or unstretched length of that portion of the elastic element 118 extending between spool 121 and end cap 68, not the distance between spool 121 and end cap 68 of connector module 16) of elastic element 118. Shorter operating lengths 119 of elastic element 118 will reduce the compliance of actuator 10, whereas longer operating lengths 119 will increase the compliance of actuator 10.

The various devices and components comprising take-up system 117 may comprise any of a wide range of components and devices that are now known in the art or that may be developed in the future that are (or would be) suitable for the intended application. Consequently, the present invention should not be regarded as limited to any particular components and devices. However, by way of example, in one embodiment, elastic element 118 may comprise an elastic cord fabricated from nylon-reinforced rubber and having a constant cross-section. Spool 121 may be fabricated from plastic, and motor 123 may comprise a stepper motor. Transmission system 125 may comprise a spur-gear transmission system. Control system 127 may comprise an electronic motor control system suitable for controlling the particular type of motor 123 that is to be used and that is suitable for providing the desired control functionality. Consequently, the present invention should not be regarded as limited to any particular type of motor control system 127. However, by way of example, in one embodiment, motor control system 127 comprises a stepper motor control system capable of reversibly driving stepper motor 123 in the clockwise and counterclockwise directions.

Referring back now primarily to FIGS. 1 and 4, the actuator 10 may also be provided with a drive system 20 for providing a means for moving the free member or compliant module 14 with respect to fixed member or contractile module 12. In the embodiment illustrated in FIGS. 1-4, drive system 20 may comprise a motor 22, a lead screw 24, a nut 26, and a control system 78. Motor 22 may be mounted to the distal end 42 of contractile module 12. Lead screw 24 is operatively connected to motor 22 so that motor 22 may turn or rotate lead screw 24 in the clockwise and counterclockwise directions. In the embodiment shown and described herein, lead screw 24 is mounted to motor 22 and is driven thereby by an integral transmission assembly. Alternatively, other arrangements are possible, as would become apparent to persons having ordinary skill in the art after having become familiar with the teachings provided herein. Consequently, the present invention should not be regarded as limited to the particular configuration shown and described herein.

Motor 22 may comprise any of a wide variety of motors, such as brushed or brushless dc motors, now known in the art or that may be developed in the future that are or would be suitable for the particular application. Consequently, the present invention should not be regarded as limited to any particular motor type. However, by way of example, in one embodiment, motor 22 comprises a high-speed brushed dc motor of the type well-known in the art and readily commercially available.

Lead screw 24 may comprise any of a wide variety of lead screws that are well-known in the art and that are readily commercially available. The pitch and diameter of the lead screw 24 may be selected to provide the actuator 10 with the desired speed and/or force development (i.e., mechanical advantage) characteristics, as would become apparent to persons having ordinary skill in the art after having become familiar with the teachings provided herein. By way of example, in one embodiment, lead screw 24 has a pitch of about 0.0625 mm (about 0.0025 inches) and a diameter of about 2.2 mm (about 0.09 inches). Lead screw may be fabricated from any of a wide range of materials, as would become apparent to persons having ordinary skill in the art. By way of example, in one embodiment, lead screw 24 is fabricated from steel.

As described above, connector module 16 is provided with a nut 26 that is configured to operatively engage lead screw 24. Accordingly, rotation of lead screw 24 will cause nut 26 to move back and forth along lead screw 24 in the directions indicated by arrows 30 and 31. Nut 26 is mounted to first end 64 of connector module 16 so that movement of the nut 26 along lead screw 24 results in corresponding movement of connector module 16 with respect to contractile module 12. Nut 26 may be provided with a pair of pins 48 and 50 that are sized to be slidably received by slots 44 and 46 provided in contractile module 12 in the manner already described. Alternatively, other arrangements are possible for mounting the nut 26 to the first end 64 of connector module 16. Nut 26 may be fabricated from any of a wide range of materials suitable for the intended application and the particular material used for lead screw 24. Consequently, the present invention should not be regarded as limited to any particular materials. However, by way of example, in one embodiment, nut 26 is fabricated from steel.

In the embodiment shown and described herein, nut 26 comprises a plain threaded nut sized to operatively engage lead screw 24 in the manner described herein. However, other variations are possible. For example, in another embodiment, nut 26 may comprise a ball nut assembly (not shown) wherein balls retained in the nut engage the threads on the lead screw 24. Generally speaking, ball nuts provide for a longer-wearing and lower friction engagement with a lead screw.

Motor control system 78 controls motor 22, thus the overall operation of actuator 10. That is, motor control system 78 may be used to operate actuator 10 to provide contraction and extension forces (i.e., in the directions of arrows 30 and 31, respectively), as well as to control the speed at which the actuator 10 operates.

Motor control system 78 may comprise an open-loop (i.e., without position feedback) or a closed-loop (i.e., with position feedback) control system, in which the motor 22 is controlled either with or without information relating to the kinematic parameters (i.e., position, velocity, and/or acceleration) of the nut 26, thus connector module 16. Generally speaking, it will be desirable to utilize a closed-loop motor control system 78. Information regarding the position of the connector module 16 may be provided by a linear encoder (not shown) operatively associated with the connector module 16. Alternatively, a rotary encoder (also not shown) mounted to the motor shaft or lead screw 24 may be used to derive information about the position of the connector module 16. In still another arrangement, motor control system 78 could sense the voltage and or current provided to motor 22 to derive information regarding the kinematic parameters of connector module 16. Travel limits (e.g., when the pins reach the ends of their respective slots) can be derived by detecting the increased current requirements of motor 22 when actuator 10 reaches the travel limits.

Motor control system 78 may also be configured to control the motor 22 based in part on the strain on actuator 10. In such a configuration, the actuator 10 may be provided with a load cell or strain gauge 80 capable of measuring the strain in the actuator. The load cell or strain gauge 80 may be operatively connected to motor control system 78 which may thereafter control the motor 22 based in part on the measured strain. The strain detected by load cell may also be used to determine the stress in the actuator 10, as would become apparent to persons having ordinary skill in the art.

In one embodiment, the motor control system 78 comprises a closed-loop motor control system that produces a pulse-width-modulated (PWM) signal for causing motor 22 to rotate in the desired direction and at the desired speed. However, because motor control systems suitable for controlling motor 22 are well-known in the art and could be readily provided by persons having ordinary skill in the art after having become familiar with the teachings provided herein, the particular motor control system 78 that may be utilized in one embodiment of the present invention will not be described in further detail herein.

Actuator 10 may be operated as follows to apply a contractile and/or extensive forces to a load or object 36. As mentioned above, in most applications, actuator 10 will be operated primarily to provide contractile forces to closely simulate biological muscle contraction. As such, the load (e.g., moveable object 36) connected to actuator 10 will be biased in the extended position. That is, the load or object 36 will tend to return to its initial position once the contractile force applied by actuator 10 is removed. Alternatively, the actuator 10 may be operated to apply an extension force (i.e., in the direction of arrow 31) as well.

In an exemplary application wherein the actuator 10 is to be operated in a manner to simulate biological muscle contraction, the actuator 10 will be pre-loaded. That is, when the object 36 is located at some initial position, the elastic element 18 will be elongated slightly, and will apply a slight contractile force to the object 36.

Additional contractile force can be applied to the object 36 by operating control system 78 as necessary to move the actuator 10 in the contractile direction (i.e., in the direction of arrow 30). High speed rotation of motor 22 will result in the rapid contraction of actuator 10, whereas lower speed rotation of motor 22 will result in a lower contraction rate. More specifically, when operated in a contraction mode, motor 22 will rotate the lead screw 24 in a direction that will cause the nut 26 (FIGS. 3 and 4) to move in direction 30. The movement of nut 26 will cause the connector member 16 and free member 14 to move in direction 30 as well. As the connector member 16 moves in direction 30, it pulls on free member 14 via elastic element 18. Elastic element 18 extends or stretches until the force exerted on elastic element 18 equals the resistance offered by the object 36. Thereafter, moveable object 36 will move in direction 30.

In an embodiment wherein the elastic element 18 is non-linear, i.e., wherein the elastic element 18 comprises the trapezoidal configuration illustrated in FIGS. 2 and 3, the compliance of actuator 10 will decrease (i.e., become less compliant) with increased contraction forces. Conversely, the compliance of actuator 10 will increase (i.e., become more compliant) with decreased contraction forces. As discussed herein, the inverse relationship between compliance and contraction force is consistent with the titin model of biological muscle contraction.

Moreover, the compliance of the actuator 10 may be selected or "tuned" to a particular application by providing the elastic element with the appropriate shape and/or configuration. Alternatively, if the actuator 10 is provided with an adjustable elastic element 118, as illustrated in FIG. 5, then the compliance of actuator 10 can not only be easily tuned for a particular application (e.g., by operating the control system 127 to change the operating length 119 of elastic element 118), but can also be tuned or changed on-the-fly, i.e., when the actuator 10 is being operated. Thus, appropriate operation of the adjustable elastic element 118 can be used to cause actuator 10 to more closely simulate or mimic the dynamics of biological muscle contraction.

In addition to the operation of the actuator 10 in a contraction phase, described above, actuator 10 may also be operated in an extension phase. Operation in the extension phase may be conducted to allow the object 36 to return to the initial position, i.e., by reducing the contraction force below the return bias. Alternatively, operation in the extension phase may be conducted so as to cause actuator 10 to apply to object 10 an extension force, i.e., a force in the direction of arrow 31. Operation of actuator 10 in the extension phase may be accomplished by reversing the direction of motor 22. To the extent that elastic element 18 is stretched or elongated during the contraction phase, movement of the actuator 10 in the extension phase will be assisted by the energy stored in elastic element 18. That is, elastic element 18 will do work on drive system 20, thereby returning to the system energy stored in elastic element 18 during the contraction phase. If the elastic element 18 becomes fully relaxed, continued rotation of lead screw 24 will cause the connector module 16 to continue to move in direction of arrow 31, until pins 60 and 62 contact the ends of respective slots 56 and 58, at which point continued movement of connector module 16 will result in corresponding movement of free member 14 in the direction of arrow 31.

Figure 6:
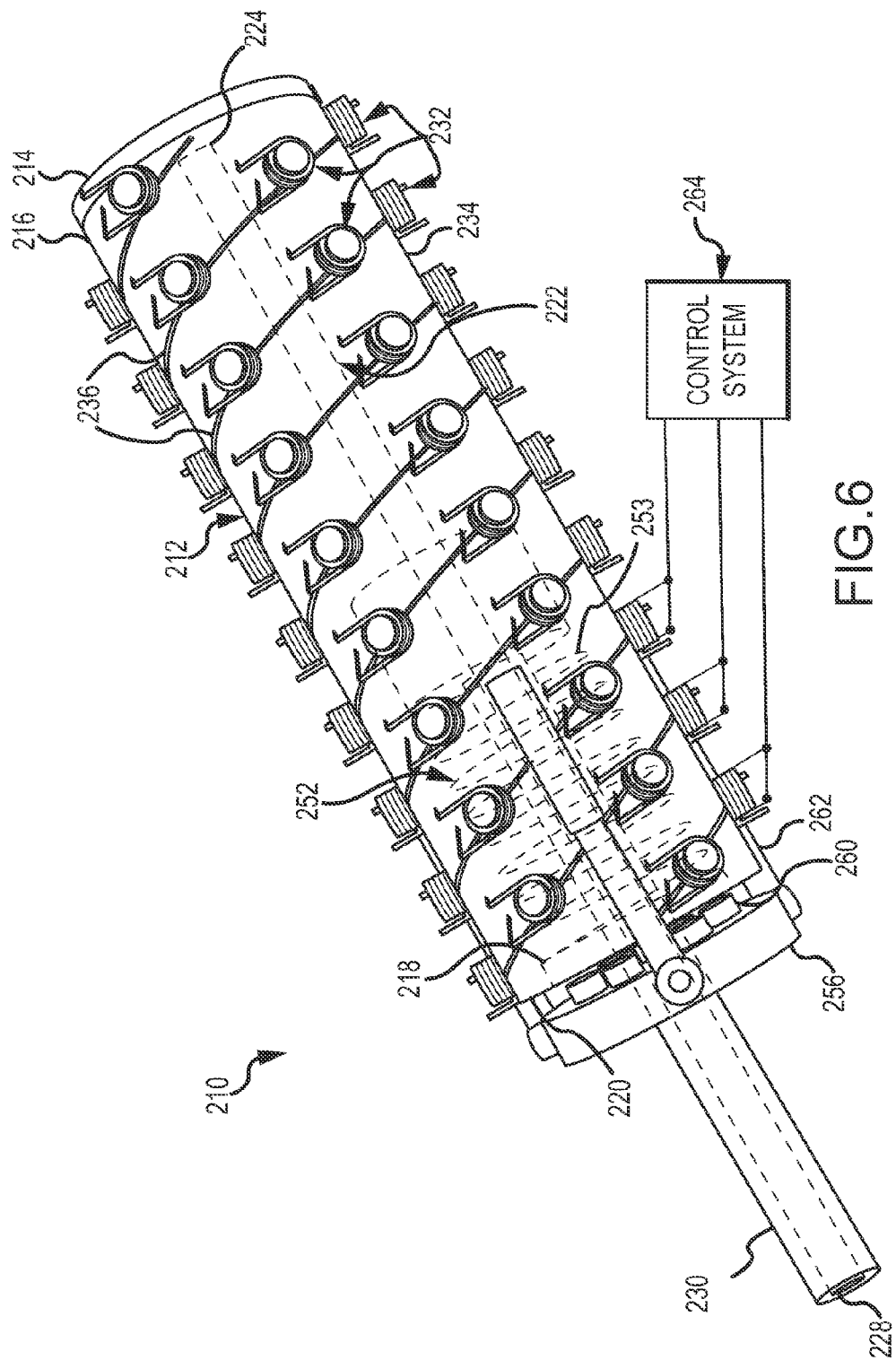
FIG. 6 is a perspective view of a second embodiment of an actuator according to the present invention showing the placement of external electromagnets along helical paths.
Figure 7:
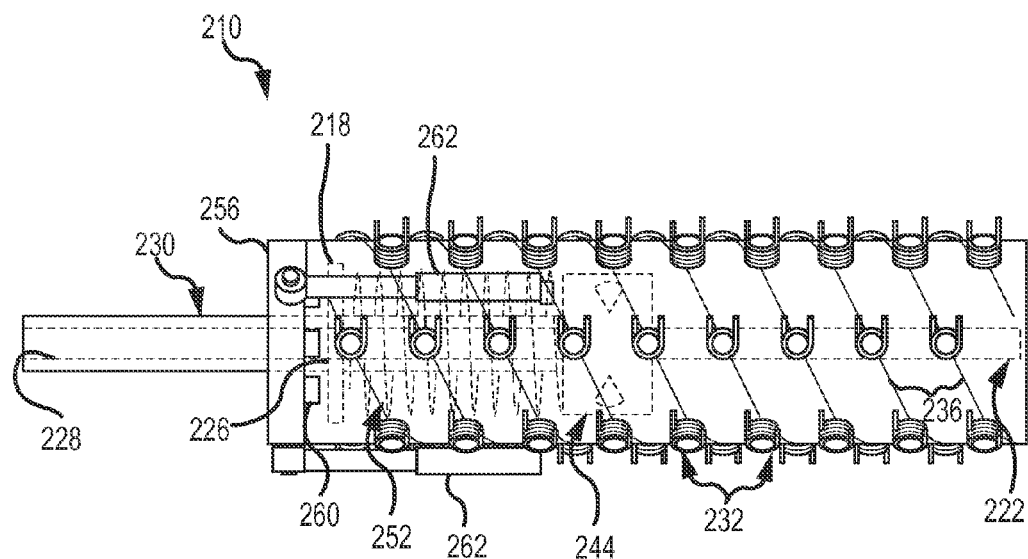
FIG. 7 is a side view in elevation of the actuator illustrated in FIG. 6.

Another embodiment 210 of an actuator according to the present invention is best seen in FIGS. 6-11 and may comprise a hollow cylindrical casing or housing 212 having a cap 214 at its fixed end 216 and a base 218 at its free end 220. Base 230 may also be provided with a central aperture or opening therein (not shown) sized to slidably receive a rotor shaft 230. A central guide member or rod 222 extends along the length of the cylindrical housing 212, i.e., between the fixed end 216 and the free end 220, as best seen in FIGS. 6 and 7. More specifically, distal end 224 of guide member or rod 222 may be attached to the cap 214, whereas proximal end 226 of guide rod 222 may be substantially supported within a central bore 228 of rotor shaft 230, as best seen in FIG. 7. Thus, in this embodiment 210, the fixed member is the housing 212, whereas the free member is the rotor shaft 230.

Figure 8:
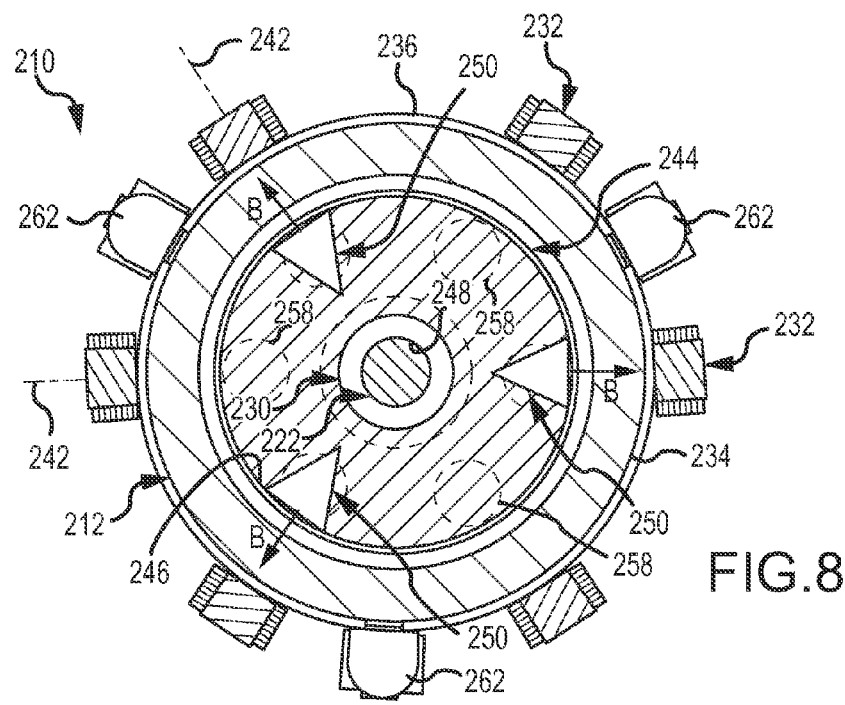
FIG. 8 is an end view of the actuator showing the arrangement of the rotor head magnets and external electromagnets.

Actuator 210 may also be provided with a plurality of electromagnets 232 mounted around the outer periphery 234 of cylindrical housing 212 along one or more helical paths or tracks 236. In the embodiment shown and described herein, the various electromagnets 232 are arranged around the outer periphery 234 of housing 212 along three (3) separate helical paths or tracks 236. Such a configuration allows the electromagnets 232 to be mounted at six positions or locations around the housing 212, as best seen in FIG. 8. Alternatively, the various electromagnets 232 may be mounted around housing 212 along a greater or lesser number of helical paths 236.

In the embodiment shown and described herein wherein the various electromagnets 232 are mounted along three separate helical paths 236, the various electromagnets 232 may be positioned around the outer periphery 234 of housing 212 at intervals of about 60°, as best seen in FIG. 8. This arrangement is geometrically efficient and represents the fewest number of electromagnets 232 needed to generate magnetic fields capable of covering the largest possible rotor assembly 244, thereby improving the rotational momentum of the rotor assembly 244. The minimum number of electromagnets 232 required for each 360° of helical track 236 is six (6). A larger number of electromagnets 232 per 360° of helical track 236 could be used and may provide better rotational resolution (i.e. the shaft 230 could complete a rotation of 360 degrees in a larger number of discrete steps).

Figure 9:
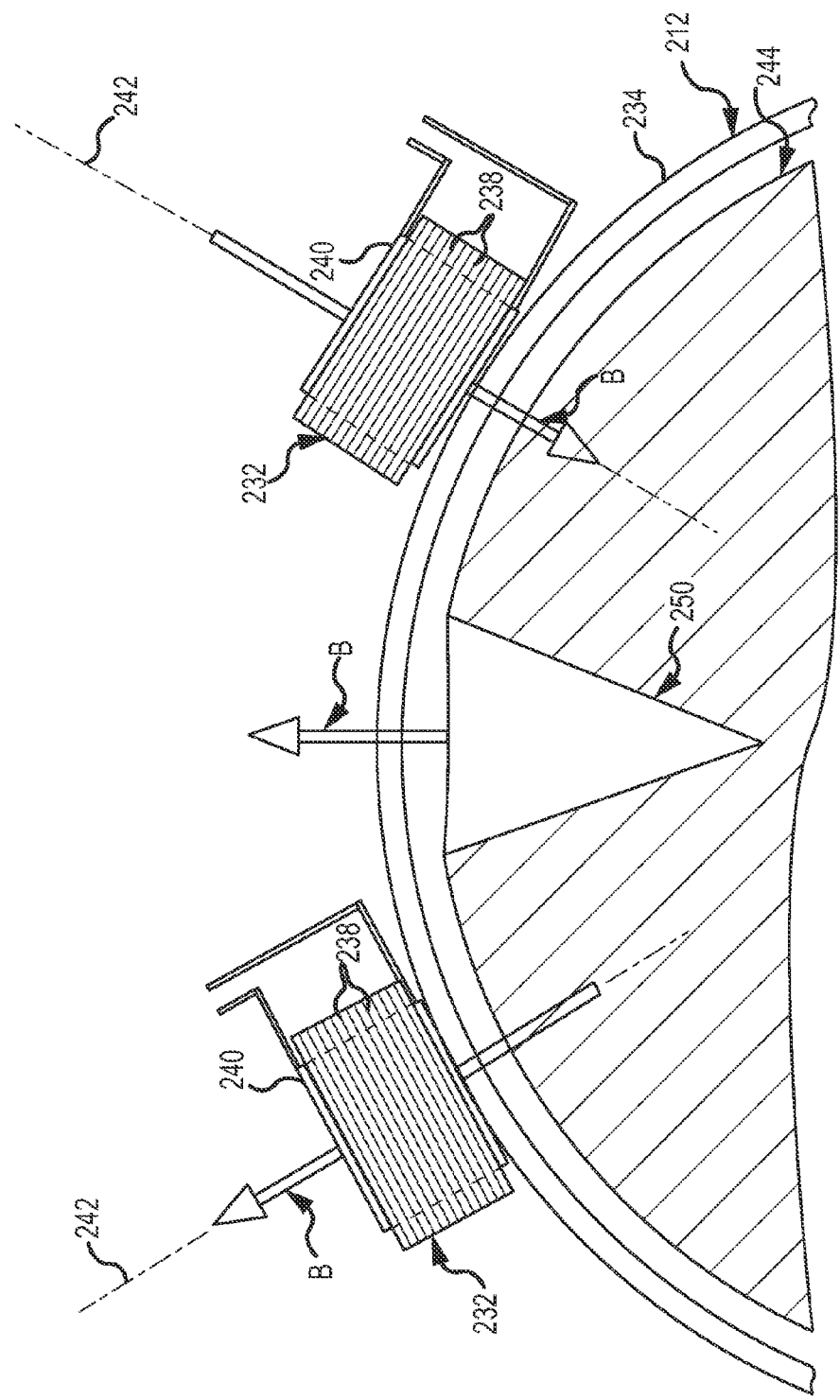
FIG. 9 is an enlarged end view of a portion of the rotor head showing the relative orientations of the magnetic fields of one rotor head magnet and a pair of external electromagnets.

Each electromagnet 232 may comprise a plurality of windings or coils 238 that are wrapped around a core 240. The various electromagnets 232 are oriented such that the axis 242 of each electromagnet 232 is generally perpendicular to the tangent of the curvature of the helical path 236, as best seen in FIG. 9. This arrangement allows the magnetic field vector B to point toward or away from the central guide member 222 of actuator 212, depending on the polarity of the voltage that is applied to the windings 238.

The various electromagnets 232 may be identical to one another, having the same number of windings 238, wound in the same direction, and around the same type of core 240. By way of example, core 240 may comprise a ferrite material. Alternatively, the core may comprise air. The windings or coils 238 may be a single layer or more preferably multiple layers of insulated wire.

Referring back now primarily to FIGS. 6-8, actuator 210 may also comprise a rotor assembly 244 having a head 246 that is sized to be slidably received by cylindrical housing 212. Head 246 is also provided with a central opening 248 (FIG. 8) therein sized to slidably receive the central guide member 222. The rotor shaft 230 is fixedly attached to head 246 and is generally aligned with the central opening 248 provided in head 246 so that the central opening 248 is generally aligned with the central bore 228 of rotor shaft 230. See also FIG. 7. Thus, the rotor head 246 and shaft 230 may slide along guide member 222, e.g., generally between the retracted and extended positions illustrated in FIGS. 11(a) and 11(c). The arrangement also supports the proximal end 226 of guide member 222, as best seen in FIG. 7.

The head 246 of rotor assembly 244 may also be provided with a plurality of magnets 250 that are mounted thereto at generally evenly spaced locations around the head 246, as best seen in FIG. 8. The various magnets 250 provided on the head 246 of rotor assembly 244 may all be oriented in generally the same direction, e.g., so that the magnetic field vectors B of each magnet 250 are oriented generally outwardly, as best seen in FIGS. 8 and 9. Alternatively, the various magnets 250 could be arranged so that their north poles face generally inwardly (i.e., so that the magnetic field vector B of each magnet 250 would point generally inwardly, toward the guide member 222).

Generally speaking, the relationship between the number of magnets 250 and the number of helical tracks 236 should be 1:1. That is, head 246 should be provided with the same number of magnets 250 as there are helical tracks 236. Alternatively, there may be a benefit to having multiple helical tracks 236 per magnet 250 if the number of electromagnets 232 per 360° of helical track 236 differs from the number provided in the exemplary embodiment. Such an arrangement will function as a form of a transmission, in that it may be used to vary the angular velocity of the output shaft 230, but at the expense of torque. The combination of the electromagnets 232 and magnets 250 forms a drive means for moving the free member (i.e., rotor shaft 230) with respect to the fixed member (i.e., housing 212).

Figure 10:
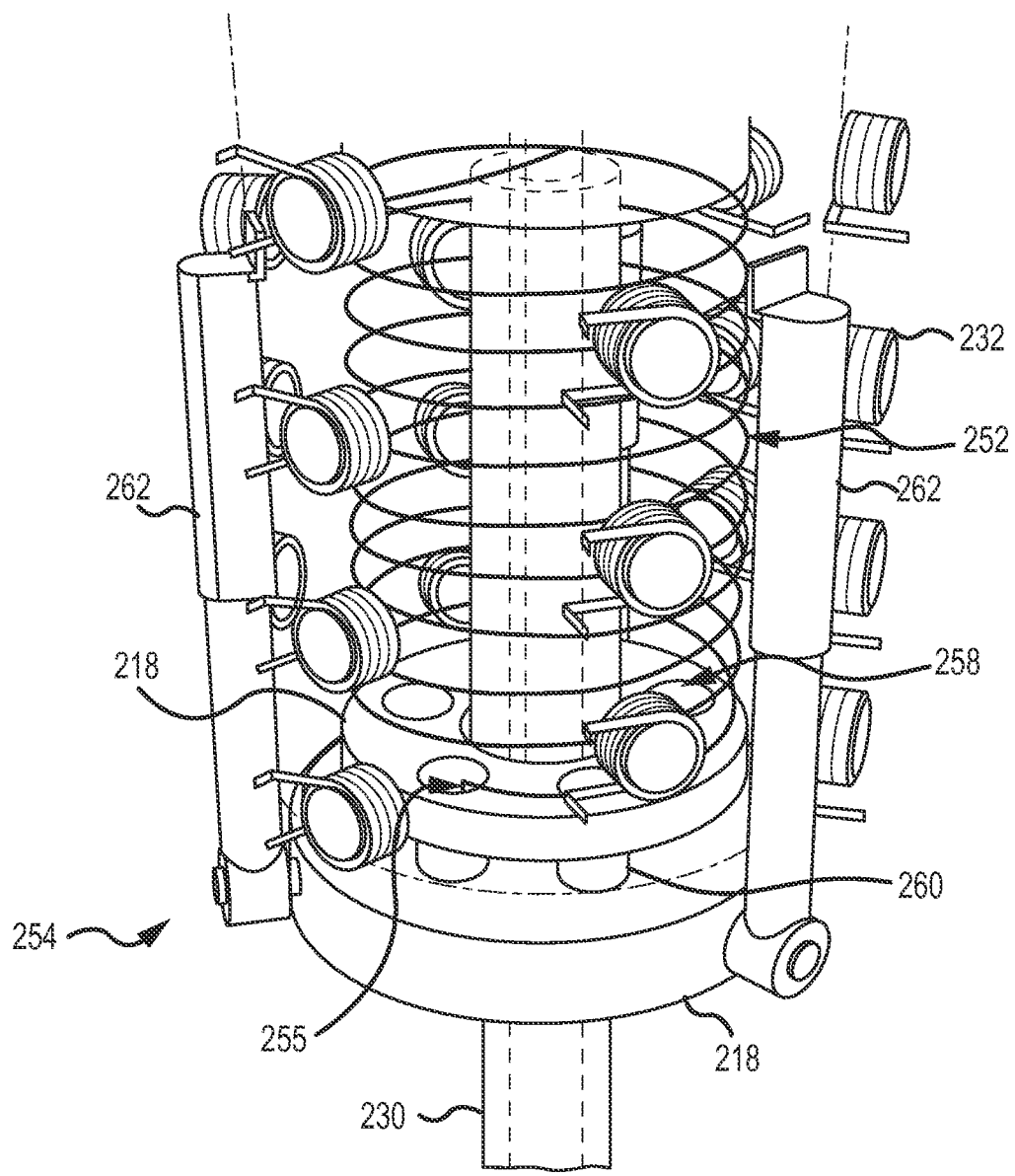
FIG. 10 is an enlarged perspective view of the actuator illustrated in FIG. 6 more clearly showing the catch for enabling and disenabling spring rotation.

The actuator 210 may also be provided with an elastic element or spring 252 positioned between the head 246 of rotor assembly 244 and the base 218, as best seen in FIGS. 6, 7, and 10. One end 253 of spring 252 may be fixedly attached to the head 246 of rotor assembly 244, whereas the other end 255 of spring 252 is configured to operatively engage base 218 of actuator 210. A catch assembly 254 may be used to cause the end 255 of spring 252 to engage and disengage from the base 218. More specifically, in the embodiment shown and described herein, the base 218 of actuator 210 may be provided with one or more holes 258 therein that are sized to engage with the end 255 of spring 252. A disk 256 having one or more pins 260 provided therein may be mounted to the housing 12, e.g., by one or more actuators 262 in the manner best seen in FIGS. 6, 7, and 10. The actuators 262 may cause the disk 256 to move toward and away from base 218. When the disk 256 is moved toward base 218, the pins 260 engage the corresponding holes 258 in base 218, ultimately pushing end 255 of spring 252 out of the hole 258, thereby disengaging spring 252 from base 218. Because the pins 260 are flush with the surface of base 218, the end 255 of spring 252 will slide around the base 218 as the head 246 of rotor assembly 244 turns without becoming re-engaged with base 218. However, when the disk 256 is moved away from the base 218, the pins 260 disengage from holes 258, allowing the end 255 of spring 252 to re-engage with one of the holes 258.

The spring 252 thus allows the actuator 210 to store energy in two different manners. First, spring 252 can be compressed between the head 246 and the base 218, thus storing energy. Second, spring can also store energy by being wound up as the head 246 of rotor assembly 244 turns in the manner described herein. Because spring 252 is attached to head 246, the spring 252 is able to store energy both by compression and by winding.

Actuator 210 may also be provided with one or more sensors (not shown) to detect the position of the rotor assembly 244 with respect to the housing 212. It is generally preferred, but not required, that the sensor comprise a non-contact type of sensor to decrease the overall friction load of the system. Exemplary non-contact sensors include optical sensors and magnetic feedback sensors. Optical sensors may require a slotted disk to be affixed to the rotor head 246 or rotor shaft 230 such that light traveling between a source and detector is interrupted as the rotor head 246 moves within housing 212. The interruptions are counted by a processing unit and the rotational speed and position are calculated.

Alternatively, the electromagnets 232 themselves may be used as non-contact sensors. For example, by multiplexing the electromagnet's 232 purpose as an attractive, or repulsive magnet, and as a sensor at a very high rate, the electromagnets 232 can be used to determine the location of the magnets 250 in the rotor head 246. That is, the movement of the magnets 250 past the coils 238 in each electromagnet 232 will cause a measurable back-current to be generated in the coil 238.

Actuator 210 may also comprise a control system 264 operatively connected to each of the electromagnets 232. Control system 264 is used to energy the various electromagnets 232 to cause the rotor assembly to both rotate and move from end-to-end, generally along a helical path in the manner described below.

The control system 264 may comprise any of a wide range of hardware and/or software elements (not shown) suitable for applying an electric current to each of the various electromagnets 232.

Referring now primarily to FIG. 9, the magnetic fields B produced by each electromagnet 232 resembles a dipole and the strength of the field decreases as a function of the inverse of the cube of the distance from the electromagnet 232. This magnetic field B can turn on, off, grow, shrink, and reverse depending on the control of the current energizing the electromagnet 232. In the example embodiment illustrated in FIG. 9, the right electromagnet 232 is energized such that the net magnetic vector B (shown by the arrow) is pointing towards that of the magnet 250 in the rotor head 246. As such, these magnets are opposing and therefore repulsive.

This enhances the rotation of the rotor head 246 that is spinning under its own momentum. The magnetic field vector B of magnet 250 is pointing away from the left electromagnet 232, as this electromagnet 232 is passing current that is opposite to that in the right electromagnet 232. The magnet 250 on rotor head 246 is therefore attracted to this electromagnet 232. Thus the rotor 246 would move toward the left hand electromagnet 232 and generate torque.

An exemplary control schedule or methodology for applying electric current to each of the electromagnets 232 is as follows. If one numbers the electromagnets 232 along each helical path 236 from 1 at the bottom to N at the top (the maximum number of electromagnets 232 is not fixed as a longer actuator 210 would require more electromagnets 232), then to compress the spring 252 maximally and extend the rotor shaft or sleeve 230 to its longest length, one would energize the three #1 electromagnets 232 so that they attract the magnets 250 in the rotor head 246. Energizing the three #2 electromagnets 232 to attract the magnets 250 while reversing the current through the #1 electromagnets 232 would cause the rotor head 246 to be repulsed from the #1 electromagnets 232 and move toward the #2 electromagnets. As the rotor head 246 gains momentum, activating #3 electromagnets 232 causes the rotor 246 to move to an intermediate position between electromagnets #2 and #3. Reversing the current in the #2 electromagnets causes them to repel the rotor head magnets 250. The rotor head 246 then rotates towards the #3 electromagnets 232. Thus, to continue rotating/retracting the shaft 230 a staggered progression of electromagnet energizations in which the electromagnet 232 is off, then turning on (attracting), then reversing the current (repelling), then turning off will allow control of the position of the rotor assembly 244, thus output shaft or sleeve 230.

This type of control of the electromagnets 232 is possible by using a series of transistors and pulse width controller with programming similar to that of a conventional stepper motor controller. The duty cycle of the electromagnets 232 (i.e. the length of energization time) in this cyclical progression depends on the strength of the electromagnets 232, the required speed of shaft rotation, the strength of the spring 252, the momentum of the rotor head 246 and the physical dimensions of the actuator 210.

To use the electromagnets 232 to sense the position of the rotor head 246, the control system 264 would have to detect or measure the voltage induced in the electromagnets 232 as the magnets 250 in the head 246 pass nearby. Such a voltage measurement can be made extremely quickly so that the momentum of the rotor head 246 keeps the shaft 230 moving, as the electromagnet 232 is not energized during the sensing operation. A computer (not shown) with an analog to digital conversion/data acquisition device or a programmable integrated circuit with enough input/output channels is capable of providing this control.

The rotor assembly 244 is capable of sliding along the guide member 222 for most of its length. The rotor assembly 244 can move along the guide member 222 by sequential activation of the electromagnets 232 in the manner described herein. In addition, the rotor assembly 244 can also move along the guide member 222 under the influence of energy returned by the spring.

Figures 11A, 11B, 11C:
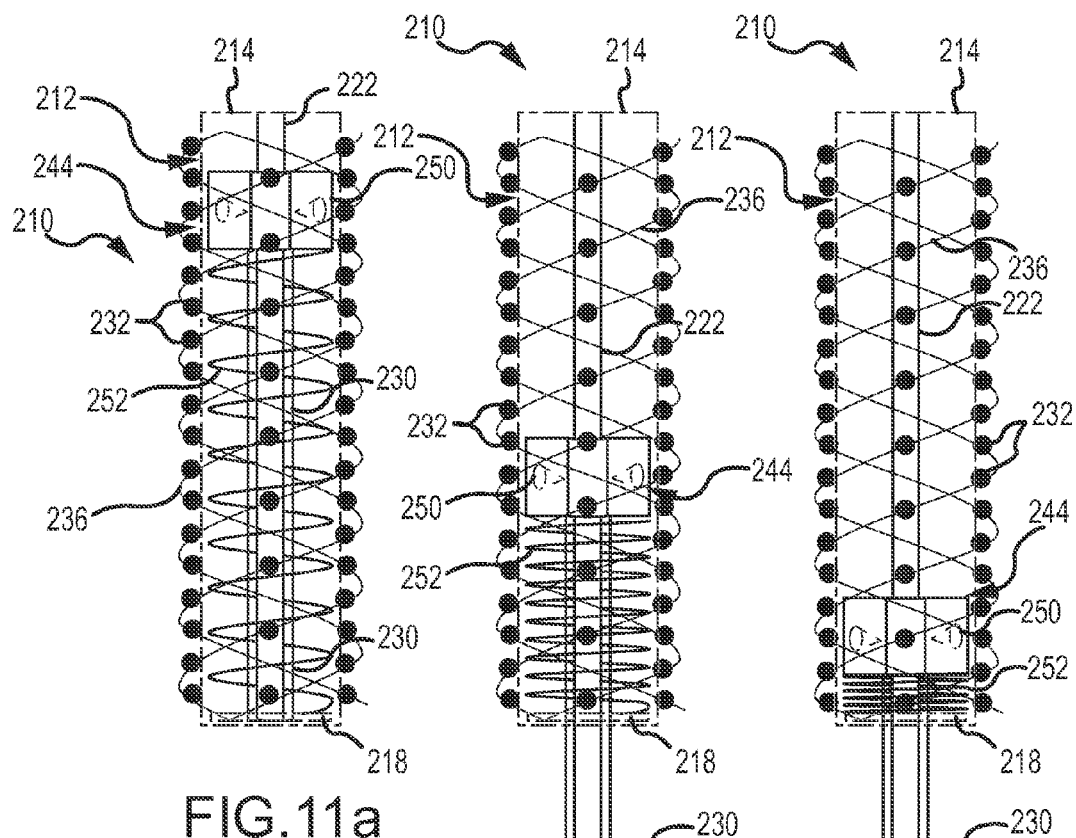
FIGS. 11(a-c) show the actuator in three different positions, a contracted position, an intermediate position, and an extended position, respectively.

Referring now primarily to FIG. 11(a-c), in the neutral position (FIG. 11b), the spring 252 is at its resting length and exerts no force on the rotor head 246. Sequentially energizing the electromagnets 232 causes the magnets 250, thus rotor head 246 to rotate and translate along a helical path described by their arrangement. Both rotation and translation of the rotor head 246 result in storage of elastic potential energy in the spring 252. See FIG. 11a. Translation of the rotor head 246 stretches the spring 252, while rotation of the rotor head 246 will wind the spring 252 around the rotor shaft 230 when the spring 252 is fixed to (i.e., engaged with) the base 218. At maximum spring extension, the free end of shaft 230 is in the retracted position illustrated in FIG. 11a.

The spring 252 can be compressed (FIG. 11c) by applying a tensile force at the end of the shaft 230, or by reversing the direction of sequential activation of the electromagnets 232. Either a force applied at the end of the shaft 230 or the force of attraction between the electromagnets 232 and the magnets 250, or both, can prevent the stretched spring 252 from recoiling to its resting position. Thus, not only can the actuator 210 do work on the spring 252, but spring 252 can do work on actuator 210.

High thermodynamic efficiency results from the fact that stored elastic potential energy is used to accelerate and decelerate the rotor assembly 244 instead of electricity.

Intrinsic stability arises because the rotor assembly 244 is free to move within the cylinder housing 212. Oscillations of the spring 252 reduce transmission of applied forces to the fixed end 214 of the actuator 210. Electromagnetic forces will damp the oscillations of the spring 252. Changes in the applied force will automatically result in changes in the position of the rotor assembly 244 (and therefore changes in the energy stored in the spring 252). The spring 252 will become stiffer (i.e., actuator 210 will become less compliant) when the compressive force increases. Actuator 210 will become more compliant when the compressive force decreases. The actuator 210 therefor exhibits viscoelastic properties.

Having herein set forth preferred embodiments of the present invention, it is anticipated that suitable modifications can be made thereto which will nonetheless remain within the scope of the invention. The invention shall therefore only be construed in accordance with the following claims:

What is claimed is:

1. An actuator, comprising:
   a fixed member;
   a free member operatively engaged with said fixed member so that said free member is moveable with respect to said fixed member;
   an elastic element operatively associated with said free member and said fixed member, said elastic element comprising a thin, sheet-like member having a trapezoidal configuration so that said elastic element has a variable compliance; and
   means for moving said free member with respect to said fixed member, said actuator being operable to store energy in said elastic element without a change in an overall length of said actuator.

2. The actuator of claim 1, wherein changes in the compliance of said elastic element changes a compliance of said actuator.

3. The actuator of claim 2, wherein said elastic element increases a compliance of said actuator with a decrease in a contraction force and wherein said elastic element decreases a compliance of said actuator with an increase in the contraction force.

4. The actuator of claim 1, wherein said means for moving does work on said elastic element.

5. The actuator of claim 1, wherein said elastic element does work on said means for moving.

6. The actuator of claim 1, further comprising a connector member, said connector member engaging said fixed member and said free member so that said connector member is moveable with respect to said fixed member and said free member.

7. The actuator of claim 6, wherein said elastic element is operatively associated with said connector member and said free member, and wherein said means for moving is operatively associated with said connector member and said fixed member so that said means for moving moves said connector member with respect to said fixed member.

8. The actuator of claim 1, wherein said free member is moveable with respect to said fixed member along an axis so that said actuator is operable along the axis.

* * * * *